United States Patent [19]

Mori et al.

[11] Patent Number: 4,619,185
[45] Date of Patent: Oct. 28, 1986

[54] BRAKE BOOSTER

[75] Inventors: Kohei Mori, Ogawa; Haruo Suzuki, Higashimatsuyama, both of Japan

[73] Assignee: Jidosha Kiki Co., Ltd., Tokyo, Japan

[21] Appl. No.: 684,450

[22] Filed: Dec. 21, 1984

[30] Foreign Application Priority Data

Dec. 28, 1983 [JP] Japan .................. 58-199987[U]

[51] Int. Cl.[4] ............................................. F15B 9/10
[52] U.S. Cl. ........................... 91/369 R; 91/376 R
[58] Field of Search ............ 91/369 C, 369 R, 369 A, 91/369 B, 376 R

[56] References Cited

U.S. PATENT DOCUMENTS

| 3,688,647 | 9/1972 | Kytta | 91/369 C |
| 4,043,251 | 8/1977 | Ohmi | 91/369 B |
| 4,406,213 | 9/1983 | Haar | 91/369 C |
| 4,472,997 | 9/1984 | Ohmi | 91/369 C |
| 4,475,444 | 10/1984 | Hendrickson | 91/369 C |

*Primary Examiner*—Robert E. Garrett
*Assistant Examiner*—Mark A. Williamson
*Attorney, Agent, or Firm*—Flynn, Thiel, Boutell & Tanis

[57] ABSTRACT

A brake booster includes a plunger which defines a valve mechanism. A stop member is provided to prevent the withdrawal of the plunger, and structure is provided to prevent the disengagement of the stop member from a valve body. Specifically, the valve body is formed with a detent, and a retainer which supports the stop member is formed with a detent which is engageable with the detent on the valve body. The retainer is disposed externally of the stop member, and the detents on both the valve body and the retainer are effective, when engaged, to prevent the disengagement of the stop member from the valve body.

3 Claims, 4 Drawing Figures

BRAKE BOOSTER

FIELD OF THE INVENTION

The invention relates to a brake booster, and more particularly, to a device for preventing disengagement of a stop member which functions to prevent a withdrawal of a valve plunger from a valve body.

BACKGROUND OF THE INVENTION

A brake booster includes a valve mechanism which is controlled to open or close in response to the depression of a brake pedal, the movement of which is transmitted through an operating rod. The valve mechanism includes a variable pressure chamber and a negative pressure chamber. When a braking action is desired, the atmospheric pressure is introduced into the variable pressure chamber, and a pressure differential across the variable pressure chamber and the negative pressure chamber acts upon a power piston to achieve a booster function. On the contrary, when a braking action is to be released, the communication between the variable pressure chamber and the atmosphere is interrupted while a communication is established between the variable pressure chamber and the negative pressure chamber, allowing the power piston to be returned to its non-operative position under the resilience of a return spring. The fluid pressure applied to the power piston is controlled by the valve mechanism which is defined by a valve plunger. To prevent the valve plunger from being withdrawn from a valve body, the latter is formed with a radial hole, into which a stop member is inserted for engagement with the valve plunger. In addition, to prevent the disengagement of the stop member from the hole, various means are employed such as supporting the outer end of the stop member by means of a diaphragm. However, means in the prior art practice which is used to prevent the disengagement of the stop member has been less than satisfactory as a result of impending the sealing function of the diaphragm, producing strange sounds during oscillation or the inability to securely prevent the disengagement.

SUMMARY OF THE INVENTION

Therefore, it is an object of the invention to provide a brake booster in which a stop member that is provided to prevent the withdrawal of a plunger can be securely prevented from being disengaged from a valve body. This object is achieved in accordance with the invention by providing a detent on the valve body and providing a retainer which includes a detent engageable with the detent on the valve body and a support for the stop member, the retainer being disposed so that the support is located outwardly of the stop member when the latter is inserted into the hole in the valve body, with the both detents on the valve body and the retainer being engaged with each other.

Above the other objects, features and advantages of the invention will become apparent from the following description with reference to the drawings.

DESCRIPTION OF EMBODIMENT

Figure 1:
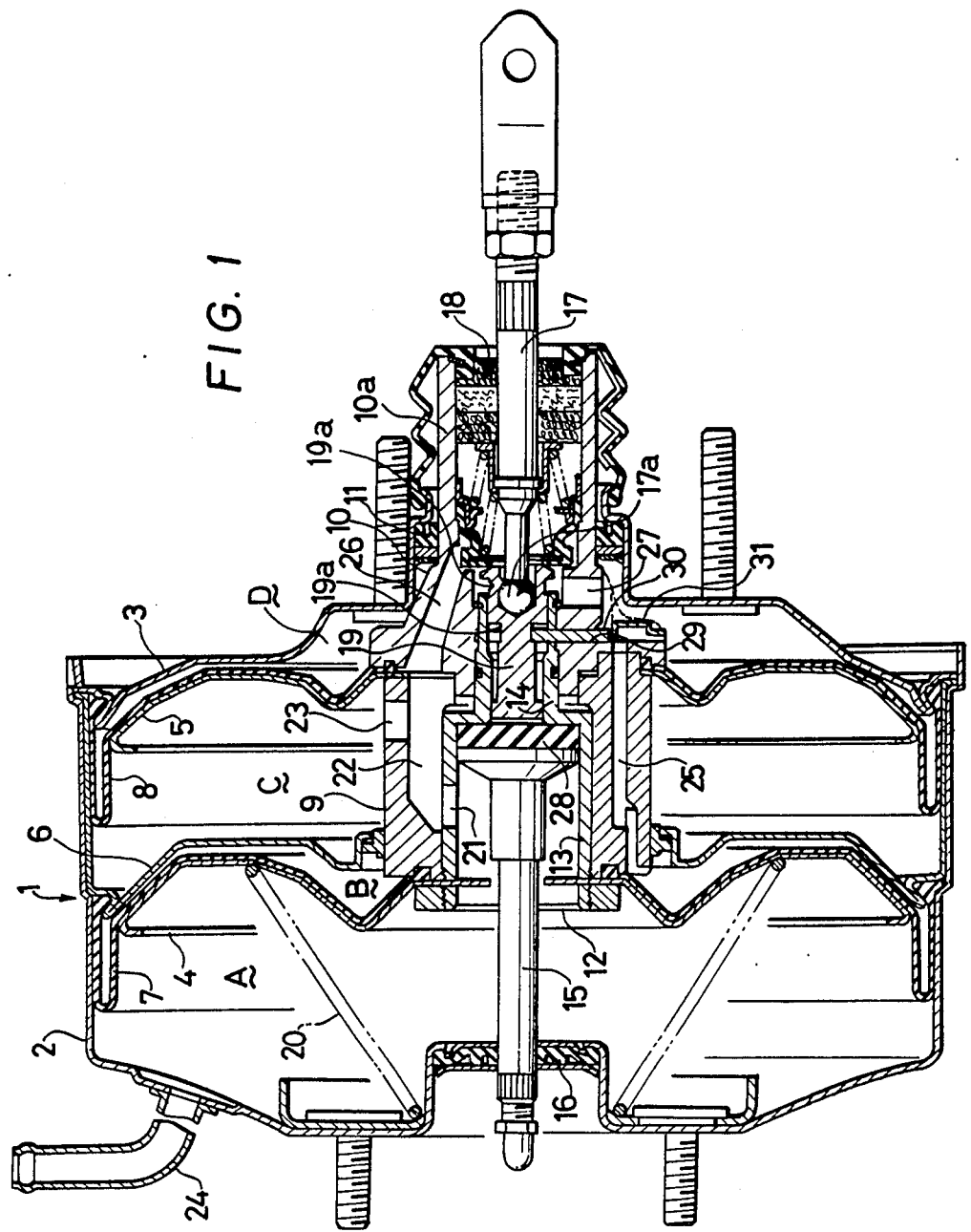
FIG. 1 is a longitudinal section of a brake booster according to one embodiment of the invention.

Referring to the drawings, FIG. 1 shows a tandem type brake booster. The apparatus includes a closed vessel 1 including a front shell 2 and a rear shell 3. A front power piston 4 and a rear power piston 5 are disposed in tandem within the vessel 1. A center plate 6 divides the interior of the vessel 1 into a front chamber in which the front power piston 4 is disposed and a rear chamber in which the rear power piston 5 is disposed. The front power piston 4 carries a front diaphragm 7 on its back, which divides the front chamber into pressure chambers A and B. Similarly, the rear power piston 5 carries a rear diaphragm 8 on its back, which divides the rear chamber into pressure chambers C and D.

A tubular member 9 is disposed in alignment with the axis of the vessel 1 and has a front end face, to which the inner periphery of the front power piston 4 is secured. The inner periphery of the rear power piston 5 is held between the rear end face of the tubular member 9 and a valve body 10 which is disposed adjacent to and rearwardly of the tubular member. The inner peripheral edge of the center plate 6 is disposed in sliding contact with the outer periphery of the tubular member 9. The valve body 10 has a rear cylindrical portion 10a which slidably extends through an opening formed in the rear shell 3 and through a seal member 11. A casing 12 is disposed in alignment with the axis of the tubular member 9 and the valve body 10, and has a front portion 13 of an increased diameter and a rear portion 14 of a decreased diameter. The front portion 13 slidably receives the base end of a push rod 15. The free end of the push rod 15 extends through an end wall of the front shell 2 while maintaining a hermetic seal, which is accomplished by means of a seal 16, for transmitting an output to a master cylinder, not shown. An operating rod 17 extends into the cylindrical portion 10a of the valve body 10 through an air cleaner 18 which is located rearwardly thereof. The valve plunger 19 has a socket into which is received a spherical portion 17a on the free end of the rod 17. A portion of the material of the plunger 19 is upset as at 19a in FIG. 1 to prevent the spherical portion 17a from pulling out of the socket. The valve plunger 19 is slidably received within the rear portion 14 of the casing 12. The rear end of the operating rod is mechanically connected to a brake pedal, not shown. A return spring 20 is disposed between the front shell 2 and the front power piston 4 for normally urging the rear power piston 5 toward the rear shell 3, acting through the front power piston 4 and the tubular member 9.

The pressure chambers A and C communicate with each other through a communication hole 21 formed in the casing 12 and an internal passage 22 and a radial bore 23, both formed in the tubular member 9, and the chamber A is connected to a source of negative pressure such as an air intake tube of an engine through a negative pressure tube 24 which opens into the end wall which defines the chamber A. The pressure chambers B and D communicate with each other through an axial passage 25 which is formed in the tubular member 9. A valve mechanism including the valve plunger 19 and which is known in itself operates the interrupt a communication between a passage 26 leading to the pressure chamber C and a passage 27 leading to the pressure chamber D in accordance with a displacement of the operating rod 17. A reaction disc 28 formed of an elastic material such as rubber is interposed between the push rod 15 and the valve plunger 19, and a braking reaction is transmitted through the push rod 15, reaction disc 28, valve plunger 19 and operating rod 17 to the brake pedal.

The valve body 10 is formed with a radial insertion bore 29, into which a stop member 30 is inserted to prevent the valve plunger 19 from being withdrawn from the valve body 10. A retainer 31 is disposed adjacent to the opening of the bore 29 in order to prevent the stop member 30 from being disengaged from the bore 29.

Figure 2:
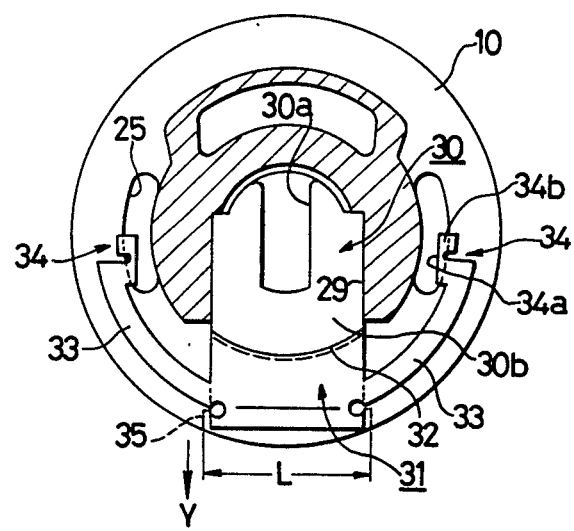
FIG. 2 is a cross section taken along the line II—II shown in FIG. 3.
Figure 4:
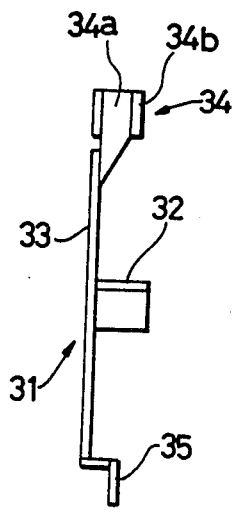
FIG. 4 is a side elevation of the retainer.
Figure 3:
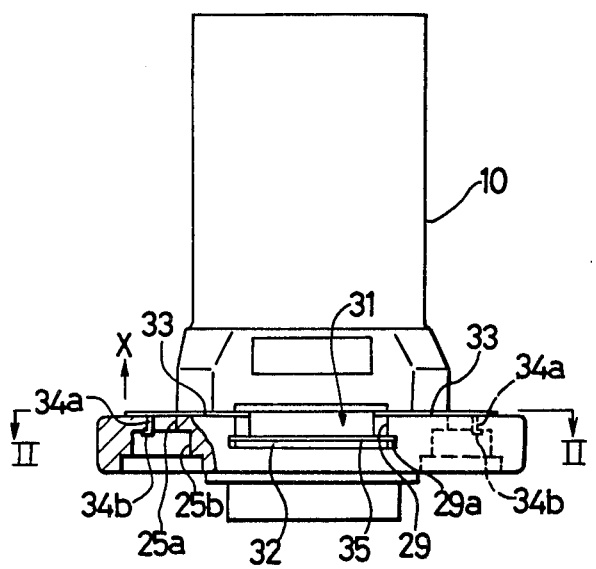
FIG. 3 is a bottom view, partly in section, of a valve body and a retainer.

Referring to FIGS. 2 to 4 for a more detailed description of the stop member 30 and the retainer 31, it will be noted that the stop member 30 is defined by a generally U-shaped plate with a notch 30a formed therein which is engaged with an annular groove 19a (see FIG. 1) formed around the periphery of the valve plunger 19. The stop member 30 includes a base 30b which is located within the bore 29 formed in the valve body 10, thus constraining the valve plunger 19 from retracting with respect to the valve body 10 beyond a given amount. The retainer 31, which functions to prevent the disengagement of the stop member 30, includes a support 32 which supports the base 30b of the stop member 30 that is inserted into the bore 29 and disposed in alignment with the axis of the valve body 10, and a pair of arcuate arms 33 which extend in opposite directions from the both sides of the support 32. It will be noted that the support 32 is defined by a curved surface which is in conformity to the arcuate profile of the base 30b of the stop member 30 so as to permit the latter to be securely retained in a stable manner. On its free end, each of the arcuate arms 33 has a detent 34 formed thereon, which is adapted to be engaged with a mating detent formed on the valve body 10, thereby allowing the retainer 31 to be secured in place. The detent 34 on the arm includes a sidewall 34a which is bent toward the same side as the curved support 32, or to the right as viewed in FIG. 4, and a channel-shaped section 34b contiguous with the sidewall 34a and opening externally of the arc. At a location below the support 32, the retainer is provided with a fold 35 having a width L which is slightly greater than the width of the support 32. It is to be noted that the fold 35 is shaped on the same side as the support 32, or folded to the right, as viewed in FIG. 4.

After inserting the stop member 30 in the bore 29, the retainer 31 is disposed so that its support 32 is inserted into the bore 29 to support the stop member 30, and by engaging its both detents 34 with mating detents formed on the valve body 10, the retainer can be secured in place. In the present embodiment, the detents formed on the valve body 10 are defined by the axial passage 25 which is provided to establish a communication between the pressure chambers B and D. While in the illustration of FIG. 1, the axial passage 25 is depicted below the valve body 10 for convenience of illustrating the communication between the pressure chamber, but in an actual apparatus, it is defined so as to be located on the opposite sides of the bore 29 into which the stop member 30 is inserted. The axial passage 25 has an arcuately curved, oblong opening 25a having a width which is reduced at its opening end as compared with the width of its internal portion 25b (see FIG. 3). Accordingly, when securing the retainer 31 within the valve body 10, after the support 32 is inserted into the bore 29 following the stop member 30, the channel-shaped portions 34b of the both detents 34 are inserted into the opening 25a of the axial passage 25 while slightly stressing the both arms 33 inward. Subsequently, when the portions 34b are pushed toward the internal portions 25b of the passages 25, the leading ends of the channel-shaped sections 34b will spread open owing to its own resilience after moving past the narrow openings 25a, whereby they are locked in position by holding the edge of the opening 25a within the channel configuration. As a result, a movement of the retainer 31 rearward in the axial direction or in a direction indicated by an arrow X in FIG. 3 is constrained. It is to be noted that the bore 29 has an increased width toward its front side or in the lower portion as viewed in FIG. 3, defining steps 29a which are engaged by the opposite ends of the fold 35, thus more positively restricting the movement of the retainer in the direction of the arrow X. A movement of the retainer in the radial direction or in a direction indicated by an arrow Y in FIG. 2 is also constrained as a result of the engagement of the sidewall 34a of the detent 34 with the lower surface of the opening 25a of the passage 25.

In this manner, the support 32 of the retainer 21 holds the stop member 30 in a stable manner while the pair of detents 34 are engaged with the valve body 10 in a manner to prevent a movement of the retainer in both radial and axial directions, thus permitting the disengagement of the stop member 30 to be positively prevented. Since the channel portion 34b holds the wall which defines the opening 25a therebetween, there occurs no rattling, effectively preventing the occurrence of stange sounds when the apparatus is subject to oscillation.

In the described embodiment, the existing passage 25 which is provided to establish a communication between the pair of pressure chambers B and D of the tandem type brake booster into which the atmosphere is introduced are utilized to eliminate the need for the provision of separate detents on the valve body 10, thus allowing existing parts in conventional arrangement to be used. However, these detents may be separately formed. It should also be understood that the invention is not limited in its use to a brake booster of tandem type.

While the invention has been shown and described in terms of a specific embodiment thereof, it should be noted that a number of changes, modifications and substitutions will readily occur to one skilled in the art without departing from the spirit and scope of the invention as defined by the appended claims.

What is claimed is:

1. In a brake booster including a power piston disposed within a closed vessel and subject to a pressure differential for reciprocatory movement, a valve mechanism for controlling fluid pressure supplied to said power piston, a valve body in which said valve mechanism is housed, a valve plunger disposed within said valve body and defining part of said valve mechanism, a bore formed to extend through said valve body, and a stop member inserted into said bore for engagement with said valve plunger to prevent said valve plunger from being withdrawn from said valve body, comprising the improvement wherein a retainer is provided which includes a support which supports said stop member and also including a detent which is engageable with a mating detent defined by an axially extending opening formed on said valve body, said axially extending opening providing communication between pressure chambers in said brake booster, said retainer being positioned externally of said stop member, the engagement between said detent on said valve body and said detent on said retainer being effective to prevent said stop member from being disengaged.

2. A brake booster according to claim 1 in which said detent on said retainer is provided on a pair of arms which extend from opposite sides of said support, said arms having a resilience which permit them to be engaged with said axially extending opening on said valve body.

3. A brake booster according to claim 1 in which said axially extending opening has therein an edge structure, wherein said arms on said retainer each have a pair of outwardly open channel-shaped portions, each of which is effective for holding said edge structure therebetween when engaged therewith.

* * * * *